US 11,150,869 B2

(12) United States Patent
Lee et al.

(10) Patent No.: US 11,150,869 B2
(45) Date of Patent: Oct. 19, 2021

(54) VOICE COMMAND FILTERING

(71) Applicant: International Business Machines Corporation, Armonk, NY (US)

(72) Inventors: Eunjin Lee, Eastleigh (GB); Daniel Cunnington, Chandler's Ford (GB); John J. Wood, St. Albans (GB); Giacomo G. Chiarella, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 15/896,323

(22) Filed: Feb. 14, 2018

(65) Prior Publication Data

US 2019/0250881 A1    Aug. 15, 2019

(51) Int. Cl.
*G06F 3/16* (2006.01)
*G10L 15/20* (2006.01)
*G10L 15/22* (2006.01)

(52) U.S. Cl.
CPC .............. *G06F 3/167* (2013.01); *G10L 15/20* (2013.01); *G10L 15/22* (2013.01)

(58) Field of Classification Search
CPC .. G06F 21/32; G06F 21/31; G06F 2221/2111; G10L 17/22; G10L 2015/223; G10L 15/08; G10L 2015/088; G10L 17/00; G10L 17/24; G10L 25/51; G10L 17/005; G10L 17/06; G10L 21/0208
See application file for complete search history.

(56) References Cited

U.S. PATENT DOCUMENTS

| | | | |
|---|---|---|---|
| 6,324,499 B1 * | 11/2001 | Lewis | .................... G10L 15/26 704/233 |
| 7,810,144 B2 | 10/2010 | Haff et al. | |
| 9,215,527 B1 | 12/2015 | Saric et al. | |
| 9,304,736 B1 | 4/2016 | Whiteley et al. | |
| 9,384,751 B2 | 7/2016 | Venkatesha et al. | |
| 9,413,868 B2 | 8/2016 | Cronin | |

(Continued)

FOREIGN PATENT DOCUMENTS

| CN | 108107403 A | 6/2018 |
|---|---|---|
| CN | 109286832 A | 1/2019 |

(Continued)

OTHER PUBLICATIONS

Lee et al., "Distinguishing Voice Commands", U.S. Appl. No. 16/545,462, filed Aug. 20, 2019.

(Continued)

*Primary Examiner* — Richemond Dorvil
*Assistant Examiner* — Mark Villena
(74) *Attorney, Agent, or Firm* — James L. Olsen

(57) ABSTRACT

Aspects of the present disclosure relate to voice command filtering. One or more directions of background noise for a location of a voice command device are determined. The one or more directions of background noise are stored as one or more blocked directions. A voice input is received at the location of the voice command device. A direction the voice input is being received from is determined and compared to the one or more blocked directions. The voice input is ignored in response to the direction of the voice input being received from corresponding to a direction of the one or more blocked directions, unless the received voice input is in a recognized voice.

15 Claims, 7 Drawing Sheets

(56) References Cited

U.S. PATENT DOCUMENTS

| | | |
|---|---|---|
| 9,431,029 B2 | 8/2016 | Yook et al. |
| 9,443,010 B1 | 9/2016 | Sundeby et al. |
| 9,548,053 B1 | 1/2017 | Basye et al. |
| 9,571,490 B2 | 2/2017 | Fu et al. |
| 9,607,612 B2 | 3/2017 | Deleeuw |
| 9,633,661 B1 | 4/2017 | Typrin et al. |
| 9,728,188 B1 | 8/2017 | Rosen et al. |
| 9,734,845 B1 | 8/2017 | Liu et al. |
| 9,818,425 B1* | 11/2017 | Ayrapetian .......... G10L 21/0224 |
| 9,820,036 B1* | 11/2017 | Tritschler ............... H04R 1/326 |
| 9,972,339 B1* | 5/2018 | Sundaram ............... G10L 17/04 |
| 10,074,364 B1 | 9/2018 | Wightman et al. |
| 10,079,026 B1* | 9/2018 | Ebenezer ............ G10L 21/0208 |
| 10,152,966 B1* | 12/2018 | O'Malley ............... G10L 15/22 |
| 10,586,534 B1 | 3/2020 | Argyropoulos et al. |
| 2008/0294439 A1 | 11/2008 | Kirby |
| 2009/0299752 A1 | 12/2009 | Rodriguez et al. |
| 2010/0179811 A1 | 7/2010 | Gupta et al. |
| 2010/0211387 A1 | 8/2010 | Chen |
| 2011/0191097 A1 | 8/2011 | Spears |
| 2012/0114138 A1 | 5/2012 | Hyun |
| 2014/0122059 A1* | 5/2014 | Patel ....................... G06F 16/40 704/9 |
| 2014/0201639 A1 | 7/2014 | Savolainen et al. |
| 2014/0207450 A1 | 7/2014 | LaVoie et al. |
| 2014/0257812 A1 | 9/2014 | Mozer |
| 2014/0270219 A1* | 9/2014 | Yu .......................... H04R 3/005 381/71.1 |
| 2014/0274218 A1* | 9/2014 | Kadiwala ................ G10L 15/08 455/570 |
| 2014/0278367 A1 | 9/2014 | Markman et al. |
| 2014/0350935 A1* | 11/2014 | Schuster ................. G10L 15/08 704/251 |
| 2015/0006176 A1 | 1/2015 | Pogue et al. |
| 2015/0172814 A1 | 6/2015 | Usher et al. |
| 2015/0254955 A1 | 9/2015 | Fields et al. |
| 2015/0279366 A1 | 10/2015 | Krestnikov et al. |
| 2016/0005394 A1 | 1/2016 | Hiroe |
| 2016/0027440 A1 | 1/2016 | Gelfenbeyn et al. |
| 2016/0284350 A1 | 9/2016 | Yun et al. |
| 2017/0061953 A1* | 3/2017 | An ......................... G06F 1/1688 |
| 2017/0125037 A1* | 5/2017 | Shin ........................ G10L 15/02 |
| 2017/0169818 A1 | 6/2017 | VanBlon et al. |
| 2017/0193180 A1 | 7/2017 | Kusens et al. |
| 2018/0018964 A1 | 1/2018 | Reilly et al. |
| 2018/0047394 A1* | 2/2018 | Tian .......................... G01S 5/00 |
| 2018/0068671 A1 | 3/2018 | Fawaz et al. |
| 2018/0129796 A1 | 5/2018 | Oswal et al. |
| 2018/0268808 A1* | 9/2018 | Song ....................... G10L 15/22 |
| 2018/0324518 A1 | 11/2018 | Dusan et al. |
| 2018/0332389 A1 | 11/2018 | Ekkizogloy et al. |
| 2019/0098399 A1* | 3/2019 | Lashkari ................ H04R 3/005 |
| 2019/0115018 A1 | 4/2019 | Zurek et al. |
| 2019/0115019 A1 | 4/2019 | Zurek et al. |
| 2019/0132694 A1* | 5/2019 | Hanes ...................... H04R 3/00 |
| 2019/0206395 A1* | 7/2019 | Aoki ....................... G10L 15/22 |
| 2019/0207777 A1 | 7/2019 | Patel et al. |
| 2019/0221210 A1* | 7/2019 | Song ....................... G06F 3/167 |
| 2019/0250881 A1 | 8/2019 | Lee et al. |
| 2019/0311719 A1 | 10/2019 | Adams |
| 2019/0320260 A1 | 10/2019 | Alders et al. |

FOREIGN PATENT DOCUMENTS

| | | |
|---|---|---|
| CN | 109308908 A | 2/2019 |
| WO | 2017173141 A1 | 10/2017 |

OTHER PUBLICATIONS

IBM, List of IBM Patents or Patent Applications Treated as Related, Aug. 20, 2019, 2 pages.

Lee et al., "Ignoring Trigger Words in Streamed Media Content", Application No. 201910358068.X, Filed Apr. 30, 2019.

Gibbs, M., "Amazon Echo: Wow!", Network World, Sep. 11, 2015, pp. 1-4. https://www.networkworld.com/article/2983632/cloud-computing/amazon-echo-wow.html.

"Change the Wake Word," Amazon.com Help, printed Jan. 15, 2018, 2 pages. https://www.amazon.com/gp/help/customer/display.html?nodeId=201971890&language=en_US.

Nichols, S., "TV anchor says live on-air 'Alexa, order me a dollhouse—guess what happens next," The Register, Jan. 7, 2017, 5 pages. https://www.theregister.co.uk/2017/01/07/tv_anchor_says_alexa_buy_me_a_dollhouse_and_she_does/.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

Islam et al., "SoundSifter: Mitigating Overhearing of Continuous Listening Devices," MobiSys '17: Proceedings of the 15th Annual International Conference on Mobile Systems, Applications, and Services, Jun. 2017, pp. 29-41, ACM. DOI: 10.1145/3081333.3081338.

"Dynamic time warping," Wikipedia, printed: Mar. 29, 2018, pp. 1-6. http://en.wikipedia.org/wiki/Dynamic_time_warping.

"Damerau-Levenshtein distance," Wikipedia, printed: Mar. 29, 2018, pp. 1-6. https://en.wikipedia.org/wiki/Damerau%E2%80%93Levenshtein_distance.

"How to detect how similar a speech recording is to another speech recording," stack overflow, Questions, posted:Jun. 2013, printed: Mar. 29, 2018, pp. 1-12. https://stackoverflow.com/questions/17010516/how-to-detect-how-similar-a-speech-recording-is-to-another-speech-recording.

Samarawickrama, L., "Comparing two audio files with Fast Fourier Transformation (FFT)," Lahiru'S TraverSAL—Tech Blog, Feb. 28, 2015, pp. 1-2. https://lstsal.wordpress.com/2015/02/28/comparing-two-audio-files/.

"IPA Phonetic Transcription of English Text | toPhonetics," printed: Mar. 29, 2018, pp. 1-2. http://lingorado.com/ipa/.

Vincent, J., "Inaudible ultrasound commands can be used to secretly control Siri, Alexa, and Google Now," The Verge, Sep. 7, 2017, pp. 1-6. https://www.theverge.com/2017/9/7/16265906/ultrasound-hack-siri-alexa-google.

Dunning et al., "Distinguishing Voice Commands," U.S. Appl. No. 15/968,320, filed May 1, 2018.

Lee et al., "Ignoring Trigger Words in Streamed Media Content," U.S. Appl. No. 15/968,349, filed May 1, 2018.

List of IBM Patents or Patent Applications Treated as Related, Signed May 1, 2018, 2 pages.

Notification of Transmittal of the International Search Report and the Written Opinion of the International Searching Authority, or the Declaration, dated Nov. 30, 2020, 9 pages.

Hurwitz et al., "Keyword Spotting for Google Assistant Using Contextual Speech Recognition", 2017, pp. 272-278.

* cited by examiner

VOICE COMMAND FILTERING

BACKGROUND

The present disclosure relates to voice command devices, and more specifically, to voice command filtering.

Voice command devices (VCD) are controlled by human voice commands. Devices are controlled by human voice commands to remove the need to operate a device using hand controls such as buttons, dials, switches, user interfaces, etc. This enables a user to operate devices whilst their hands are occupied with other tasks or if they are not close enough to the device to touch it.

VCDs may take various form including devices with a dedicated use such as home appliances, controllers for other devices, or be used as personal assistants. VCDs in the form of virtual personal assistants may be provided as part of computing devices including mobile phones. Virtual personal assistants may include voice activated instructions for performing tasks or services in response to voice commands and inputs.

VCDs may be activated by a voice command in the form of one or more trigger words. VCDs may use voice recognition to be programmed only to respond to a registered individual's voice or a group of registered individual's voices. This prevents non-registered users from giving commands. Other types of VCD are not tuned to registered users and allow any user to give a command in the form of designated command words and instructions.

SUMMARY

Embodiments of the present disclosure disclose a method, computer program product, and system for voice command filtering. One or more directions of background noise for a location of a voice command device can be determined. The one or more directions of background noise can be stored as one or more blocked directions. A voice input can be received at the location of the voice command device. A direction the voice input is being received from can be determined and compared to the one or more blocked directions. The voice input can be ignored in response to the direction of the voice input being received from corresponding to a direction of the one or more blocked directions, unless the received voice input is in a recognized voice.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
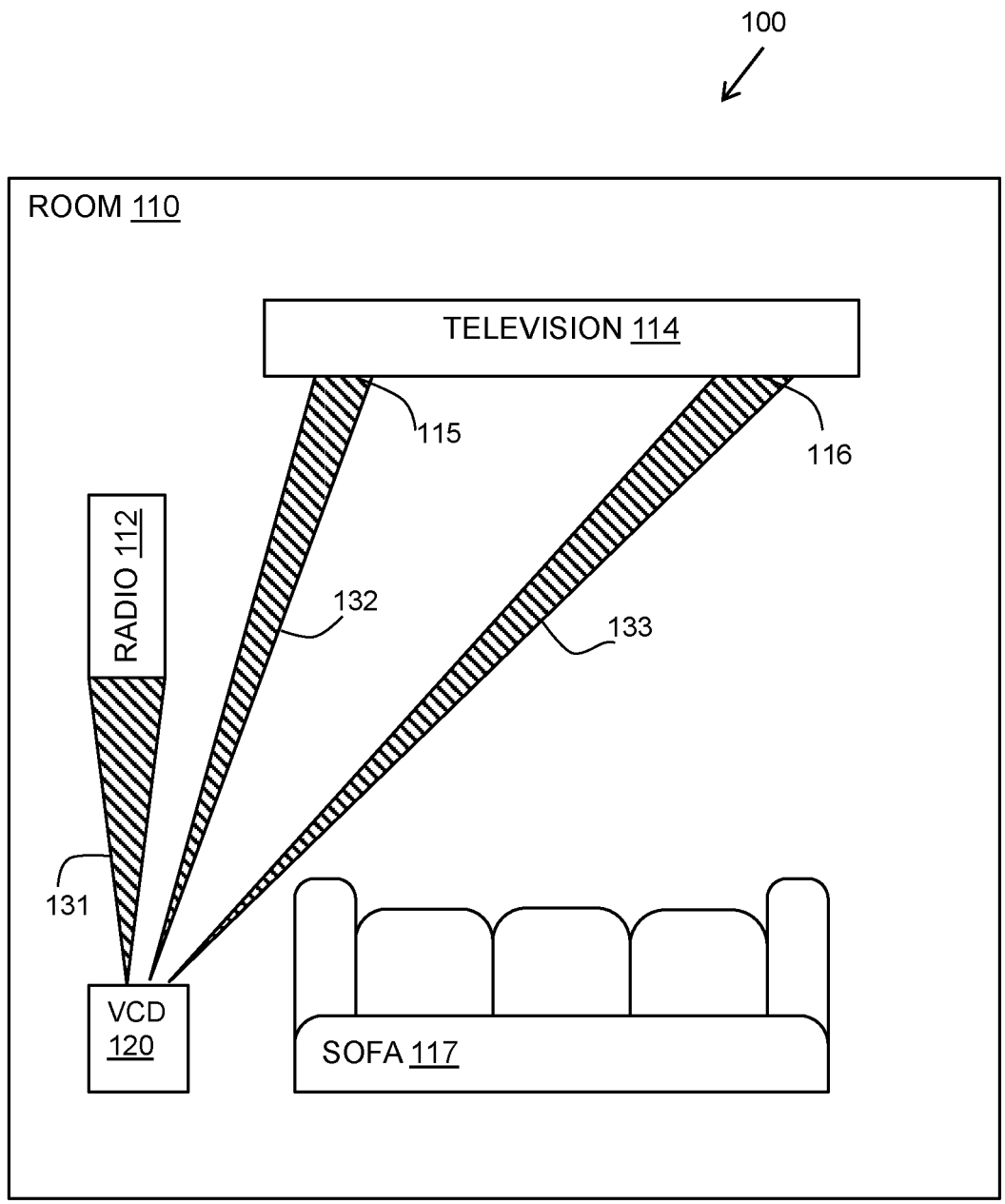
FIG. 1 is a schematic diagram illustrating an environment in which embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field voice command devices, and in particular to voice command filtering. While the present disclosure is not necessarily limited to such applications, various aspects of the disclosure may be appreciated through a discussion of various examples using this context.

Voice command devices (VCD) are controlled by human voice commands. Devices are controlled by human voice commands to remove the need to operate a device using hand controls such as buttons, dials, switches, user interfaces, etc. This enables a user to operate devices whilst their hands are occupied with other tasks or if they are not close enough to the device to touch it.

Complications arise when a VCD is triggered by a voice command from a television, radio, computer, or other non-human device that emits a voice in the vicinity of the VCD.

For example, a VCD in the form of a smart speaker incorporating a voice-controlled intelligent personal assistant may be provided in a living room. The smart speaker may erroneously respond to audio from a television. Sometimes this may be a benign command that the smart speaker does not understand; however, occasionally the audio is a valid command or trigger word that may result in an action by the intelligent personal assistant.

A voice command device (VCD) is provided with additional functionality to identify valid voice commands by ignoring voice commands from blocked directions from which background voice noise is known to originate when the VCD is positioned in a given location.

The method and system identify directions where background noise or strings are usually heard. Strings may be background audio samples that may include spoken words or text. The identified direction may be tagged as a potential location of a sound emitting device that should be ignored by the VCD. The functionality may be refined by ignoring voice commands from a blocked direction unless they are from a recognized voice, for example, a registered voice of the VCD identified by the voice tone and pattern.

Referring now to FIG. 1, a schematic diagram 100 shows a room 110 in which a voice command device (VCD) 120 may be regularly positioned. For example, the VCD 120 may be in the form of a smart speaker including a voice-controlled intelligent personal assistant that is located on a table next to a sofa 117 in the room 110.

The room 110 may include a television 114 from which audio may be emitted from two speakers 115, 116 associated with the television 114. The room 110 may also include a radio 112 with a speaker.

The VCD 120 may, at various times, receive audio inputs from the two television speakers 115, 116 and the radio 112. These audio inputs may include voices that include command words that unintentionally trigger the VCD 120 or provide input to the VCD 120.

Aspects of the present disclosure provide added functionality to the VCD 120 to learn directions (e.g., relative angles) of audio inputs that should be ignored for a given location of the VCD 120.

Over time, the VCD 120 may learn to identify sources of background noise in a room 110 by the direction of their audio input to the VCD 120. In this example, the radio 120 is located at approximately 0 degrees in relation to the VCD 120 and a hashed triangle 131 illustrates how the audio output of the radio 112 may be received at the VCD 120. The two speakers 115, 116 of the television 114 may be detected as being located in directions of approximately 15-20 degrees and 40-45 degrees respectively and hashed triangles 132, 133 illustrates how the audio output of the speakers 115, 116 may be received at the VCD 120. Over time, these directions may be learned by the VCD 120 as blocked directions from which audio commands are to be ignored.

In another example, a VCD 120 may be a fixed appliance such as a washing machine and a blocked direction may be learned for a source of audio input such as a radio in the same room as the washing machine.

If the VCD 120 receives a command from these blocked directions, it may ignore the command unless it is configured to accept commands from these directions from a known registered user's voice.

The described method and system enable a VCD 120 that is often positioned in a given location to ignore unwanted sources of commands for that location.

Figure 2A:
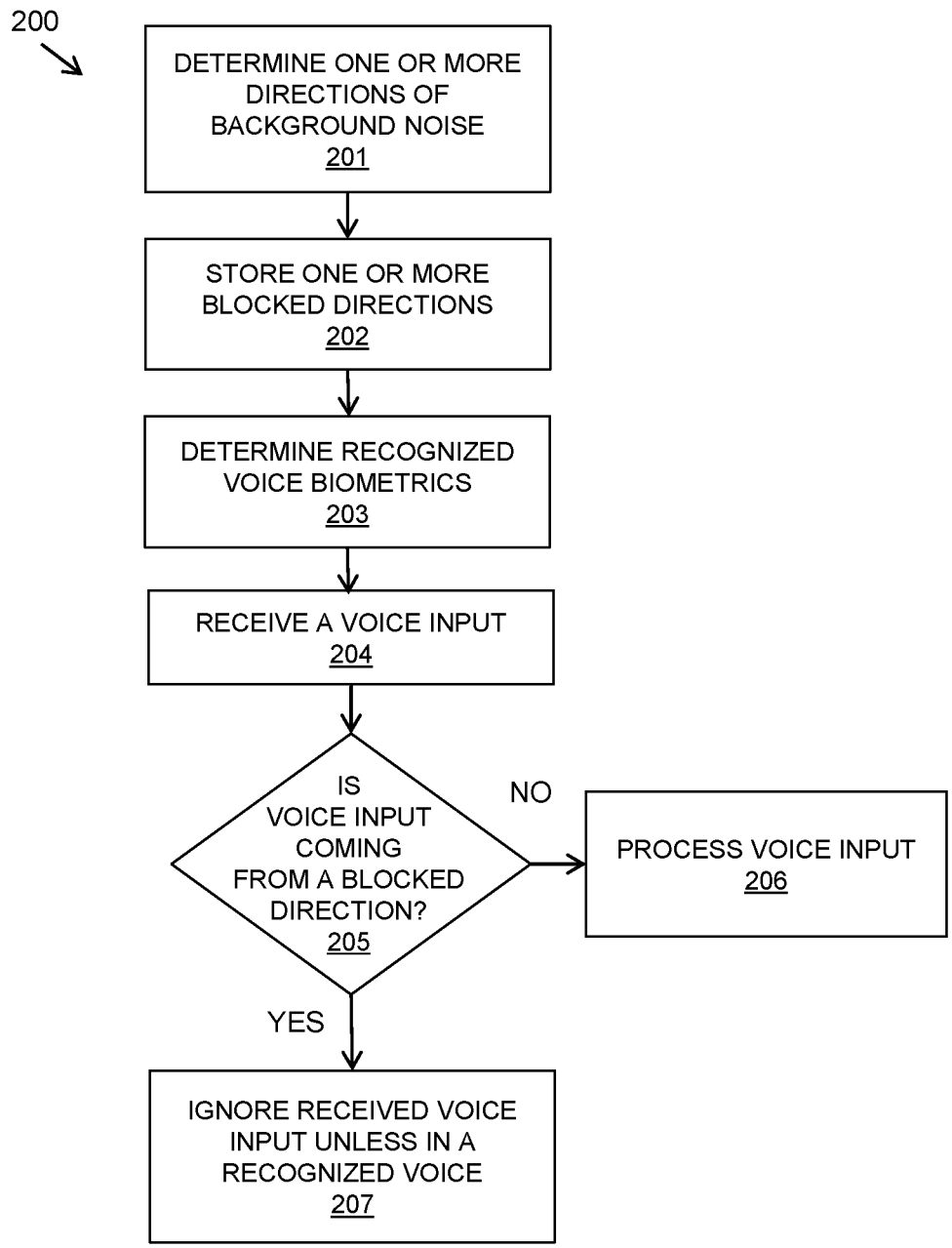
FIG. 2A is a flow diagram illustrating an example method for voice command filtering, in accordance with embodiments of the present disclosure.

FIG. 2A is a flow-diagram illustrating a process 200 for filtering audio inputs received by a voice command device, in accordance with embodiments of the present disclosure.

Process 200 begins by determining one or more directions of background voice noise. This is illustrated at step 201. The VCD 120 may learn the directions for the location by receiving background audio inputs from these directions, and analyzing the relative direction in which the audio inputs are received from, which may include both voice and non-voice background noises. In some embodiments, determining the one or more directions of background noise is completed by triangulation (e.g., by measuring the audio input at two or more known locations (e.g., which can be microphones mounted in the VCD 120) in space and determining the direction and/or location of the audio input by measuring the angles from the known points). Triangulation can be completed by including two or more microphones in the VCD 120 and cross referencing the audio data received at the two or more microphones. In some embodiments, the one or more blocked directions can be determined by time difference of arrival (TDOA). This method can similarly utilize two or more microphones. The data received at the two or more microphones can be analyzed to determine a location of the received audio input based on the difference of arrival of the audio input. In some embodiments, the one or more blocked directions can be determined by associating sensors (e.g., optical sensors, GPS sensors, RFID tags, etc.) with speakers in the room (e.g., speakers 112, 115, and 116 of FIG. 1) and using the sensors to determine the blocked direction. For example, optical sensors can be associated with the VCD 120 and one or more speakers in the room. The blocked directions can then be determined by the optical sensor associated with the VCD 120. Alternatively, directions of background voice noise may be configured by a user.

The one or more blocked directions are then stored. This is illustrated at step 202. The one or more blocked directions can be stored in any suitable memory (e.g., flash memory, RAM, hard disk memory, etc.). In some embodiments, the one or more blocked directions are stored on local memory on the VCD 120. In some embodiments, the one or more blocked directions can be transmitted over a network and stored on another machine.

In addition, the VCD 120 determines recognized voice biometrics. This is illustrated at step 203. Determining recognized voice biometrics can be completed by, for example, applying voice recognition for one or more registered voices. The voice recognition may utilize characteristics of the voice such as pitch and tone. The recognized voice biometrics can be stored on the VCD 120 to determine whether incoming voices are registered with the VCD 120. This can be accomplished by comparing the incoming voices to the recognized voice biometrics to determine whether the incoming voice is a recognized voice.

A voice input is then received. This is illustrated at step 204. The voice input can be received by a human or non-human entity. Accordingly, the term "voice input" does not necessarily have to be a voice, but can rather include background noise (e.g., such as a running laundry machine, music from a speaker, etc.).

A determination is then made whether the voice input is coming from a blocked direction. This is illustrated at step 205. Determining whether the voice input is coming from a blocked direction can be completed by comparing the stored blocked directions to the direction the voice input was received from to determine if the received voice input is associated with a stored blocked direction. If the voice input is coming from a direction which differs from the stored blocked directions, then a determination can be made that the voice input is not coming from a blocked direction.

If a determination is made that the voice input is not coming from a blocked direction, then the voice input is processed. This is illustrated at step 206. In some embodiments, processing includes identifying a command and executing the received command. In some embodiments, processing can include comparing the received voice input to stored command data (e.g., data that specifies command words and command initiation protocols) to determine whether the received voice input corresponds to (e.g., matches) a command of the stored command data. For example, if the voice input includes the phrase "Power Off", and "Power Off" is specified as a command initiation phrase in the stored command data, then a determination can be made that the voice input is a command and the command can be executed (e.g., the power can be turned off).

If a determination is made that the voice input is received from a blocked direction, it can be ignored unless it is associated with a recognized voice. This is illustrated at step 207. To determine whether the voice in the blocked direction is a recognized voice, tonal/pitch analysis of the received audio voice can be completed in response to a determination that the voice input is received from a blocked direction. If the tonal/pitch analysis indicates that the voice input is a voice associated with a recognized user, then the voice input can be processed (e.g., as in step 206).

Figure 2B:
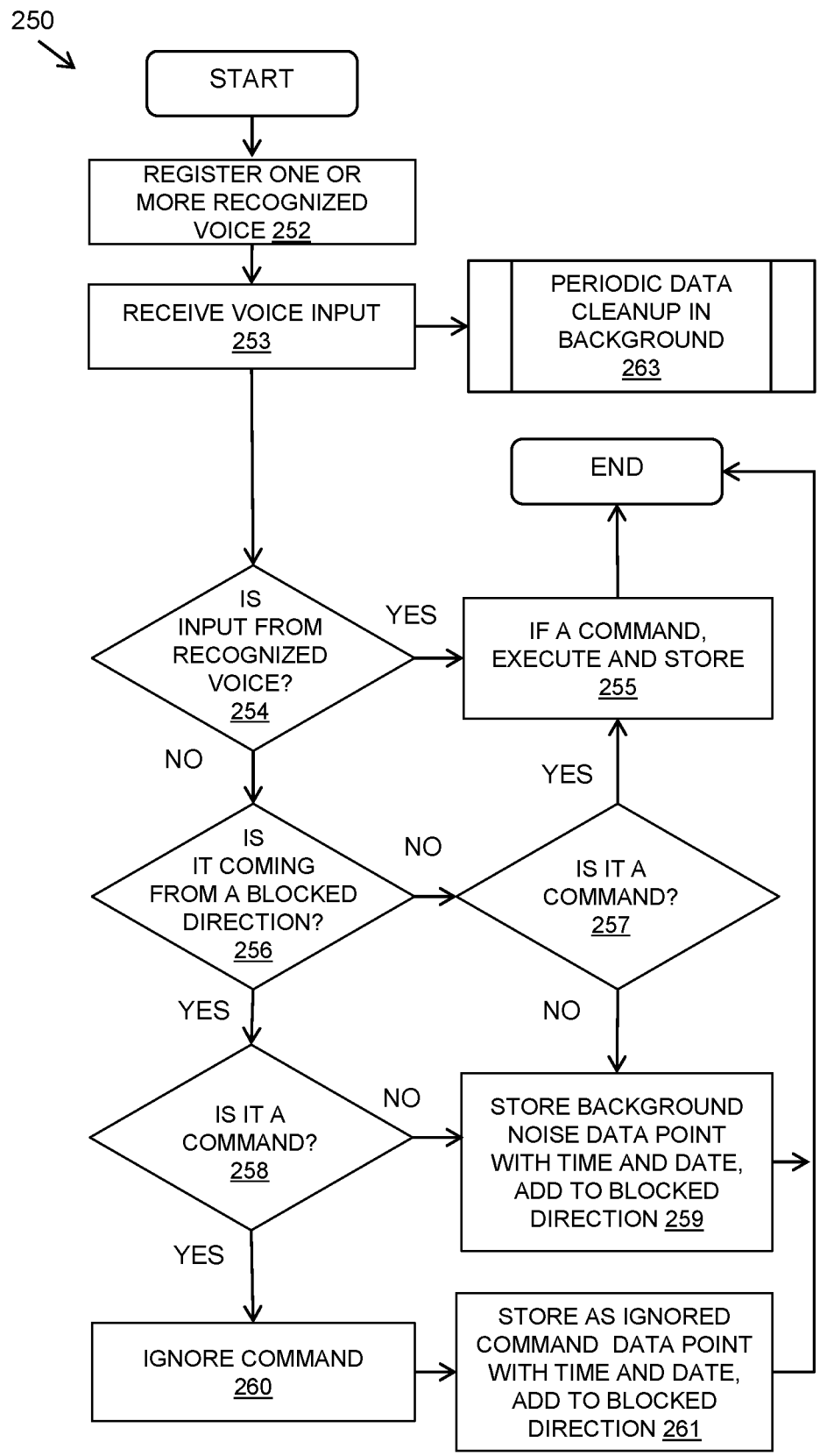
FIG. 2B is a flow diagram illustrating another example method for voice command filtering, in accordance with embodiments of the present disclosure.

Referring to FIG. 2B, shown is a flow diagram of an example process 250 for filtering audio data received by a voice command device (e.g., VCD 120).

Process 250 starts where one or more recognized voices are registered on the VCD. This is illustrated at step 252. For example, the VCD may include functionality to register a primary user of the VCD to ensure the voice biometrics of the voice are easily recognized. The voice registration can be completed by analyzing various voice inputs from a primary user. The analyzed voice inputs can then be used to distinguish a tone and pitch for the primary user. Alternatively, regularly received voices may be automatically learned and registered by recording pitch and tonal data received during the use of the device. Having voice recognition functionality may not exclude commands or inputs from other non-registered voices from being accepted by the VCD. In some embodiments, no voices may be registered, and the method may block directions for all voice inputs.

A voice input is then received. This is illustrated at step 253. In some embodiments, non-voice inputs are automatically filtered, which may be an inherent functionality to a VCD. In some embodiments, voice inputs may include background noise voices or strings (e.g., which include non-human voice inputs).

A determination is then made whether the voice input is associated with a recognized voice. This is illustrated at step 254. Determining whether the voice input is associated with a recognized voice can be completed by analyzing the voice biometrics of the received voice input (e.g., by completing a tone and pitch analysis of the received voice input) and comparing the analyzed voice input data to the registered voice biometrics.

If the voice input is associated with a recognized voice, and the voice input is a command, the command is executed. This is illustrated at step 255. This enables the VCD to respond to voice inputs from registered users regardless of the direction from which the voice input is received including if it is received from a blocked direction. The method may store a data point of a valid command for learning purposes including, optionally storing the time at which and direction from which the voice command was received. This may be used, for example, to learn common directions of valid commands, such as from a favorite position in relation to the VCD that may be boosted for more sensitive command recognition.

If the voice input is not from a recognized voice, a determination can be made whether the voice input is originating from a blocked direction. This is illustrated at step 256. Determining the direction of a voice input may include measuring the angle of the incoming voice input. VCDs may have known functionality for evaluating a direction of incoming sound. For example, multiple microphones may be positioned on the device and the detection of the sound across the multiple microphones may enable the position to be determined (e.g., using triangulation or time of arrival difference). A blocked direction may be stored as a range of angles of incidence of incoming sound to the receiver. In the case of multiple microphones, the blocked direction may be for voice inputs received predominantly or more strongly at one or more of the multiple microphones. The direction of the incoming sound may be determined in a three-dimensional arrangement with input directions determined from above or below as well as in a lateral direction around the VCD.

If the voice input is not from a blocked direction, a determination is made whether the voice input is a command. This is illustrated at step 257. If it is a command, then the command may be executed at step 255. This enables a command to be executed from a non-registered voice, i.e. from a new or guest user and does not restrict the user of the VCD to registered users. The method may store the command as a command data point, optionally, including the direction from which the command was received. This may be analyzed for further voice registration, to determine if the command is overridden by a further user input, etc. The method may then end and await a further voice input (e.g., at step 253).

If a determination is made that the voice input is not from a blocked direction and is not a command, a determination is made that the audio input is a source of background noise. The background noise data is then time stamped with a time, date, and the direction (e.g., angle of incidence) the background noise was received from. The direction can then be added as a blocked direction such that if voice inputs are repeatedly received from this direction they can be blocked. This is illustrated at step 259. A threshold can be implemented to determine when a voice input received from a non-blocked direction that does not specify a command can be determined to be background noise.

For example, a plurality of voice inputs can be received from a particular direction. Further, each of the plurality of voice inputs are received at a distinct time. The plurality of received voice inputs can be compared to stored command data to determine whether each (e.g., individually, not collectively) of the plurality of received voices corresponds to the stored command data. The number of voice inputs of the plurality of voice inputs that do not correspond to the stored command data can be determined. The number of voice inputs that do not correspond to the stored command data can be compared to a non-command voice input threshold (e.g., a threshold that specifies a number of non-command voice inputs that can be received for a given direction before storing the given direction with the one or more blocked directions). In response to the number of voice inputs that do not correspond to the stored command data exceeding the non-command voice input threshold, the particular direction can be stored with the one or more blocked directions. In some embodiments, the background noise threshold includes sound characteristic information, such as frequency and amplitude.

If a determination is made that the voice input is a command, the command may be ignored. This is illustrated at step 260. The voice input may then be stored as an ignored command data point with a timestamp of a time and date together with the received direction of the voice input. This is illustrated at step 261. This data may be used for analysis of blocked directions. Further, this data may be used to analyze whether a device is still located at a blocked direction, by referencing the stored time and date of the background noise data points. A threshold number of non-identified voice commands may be stored from a given direction before adding the direction to the blocked directions.

The analysis of stored data points of valid voice commands, background noise inputs, and ignored or invalid commands recorded with the incoming directions may be carried out to learn blocked directions, and, optionally, common directions for valid commands. A periodic data cleanup (e.g., formatting and filtering) may be carried out at step 263 as a background process of the stored data points.

Data points may be stored to allow the method and system to identify more precisely directions in which noise should be ignored. Noise which is not from a recognized voice coming from a known blocked direction can be ignored regardless of whether it is a command or not.

Storing data points of different types of noise allows for further analysis of background noise and thus gives finer discrimination on which directions to block. For example, an oven beeping may be received by a VCD from the direction of the oven. Over time, the background noise data points may be analyzed to identify that the background noise data point in this direction has never included a command, or the background noise data points from a given direction are very similar in terms of the audio content. In this case, commands may be allowed from this direction.

The VCD may include a user input mechanism to override blocked direction inputs or to override execution of a command. The method may also learn from such override inputs from the user to improve on the performance.

This method assumes that the VCD stays in the same location in the same room, which is often the case. If the VCD is moved to a new location, it may relearn its environment to identify block directions for non-human sources in relation to the VCD at the new location. The method may store blocked directions in relation to a given location of the VCD so that the VCD may be returned to a previous location and reconfigure the blocked directions without relearning its environment.

In some embodiments, the method may allow configuration of known directions to be blocked. This may remove the need or be in addition to the learning of blocked directions over time and may enable a user to pre-set blocked directions from their knowledge of the directions from which interfering audio may be received.

The user may position the VCD at a location and the VCD may allow input to configure the blocked locations. This may be via a graphical user interface, via a remote programming service, etc. In one embodiment, the configuration of blocked directions may be carried out using voice commands by a user standing at an angle to be blocked (e.g., in front of a television) and commanding that direction to be blocked. In another embodiment, a pre-configuration of a room may be loaded and this may be stored for use if the VCD is moved.

Using the example shown in FIG. 1, the VCD 120 may start picking up commands from the television 114 and may store the direction of these incoming commands. The method may then filter out commands and background noise that are always issued from the same direction. Commands from that direction that are not in line with the voices that usually give commands from other directions will be ignored.

An advantage of the described method is that, unlike devices that block all commands that are not from a known user, the VCD may include an additional level of verification in the form of direction. When a new user arrives in the proximity of the VCD and issues a command, the VCD may still execute the command because it is coming from a direction which is not blocked due to association with static audio emitting objects.

The technical problem that is solved is enabling the device to identify that sounds are coming from other devices as opposed to human users.

Figure 3:
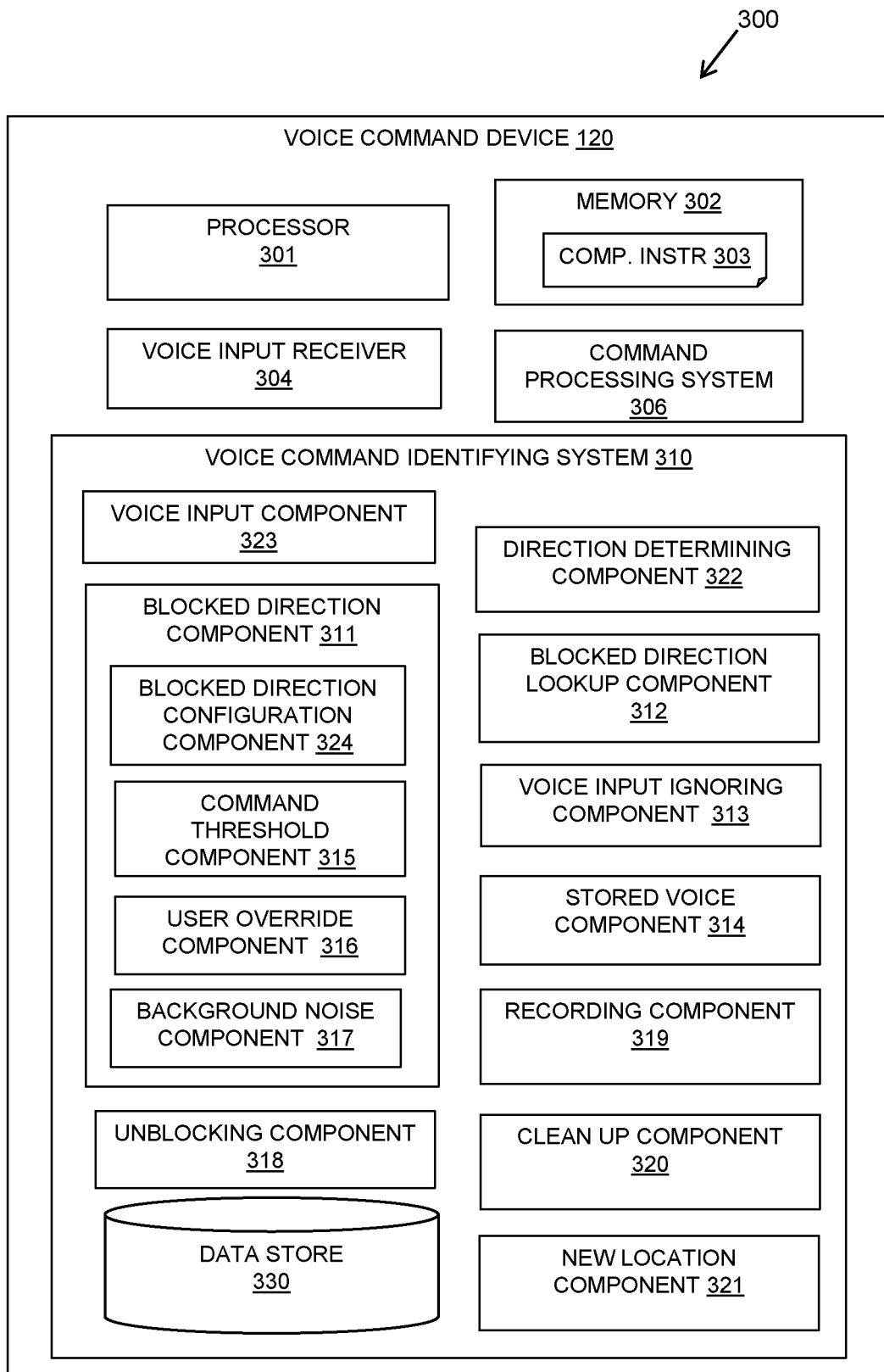
FIG. 3 is a block diagram of a computing environment in which illustrative embodiments of the present disclosure can be implemented.

FIG. 3 is a block diagram illustrating a computing environment 300 in which illustrative embodiments of the present disclosure can be implemented.

The VCD 120 may be a dedicated device or part of a multi-purpose computing device including at least one processor 301, a hardware module, or a circuit for executing the functions of the described components. Multiple processors running parallel processing threads may be provided enabling parallel processing of some or all of the functions of the components. Memory 302 may be configured to provide computer instructions 303 to the at least one processor 301 to carry out the functionality of the components.

The VCD 120 may include a voice input receiver 304 that is dependent on the type of device and known voice processing. In one embodiment, the voice input receiver 304 may be in the form of multiple microphones provided in an array to receive voice inputs from different directions relative to the VCD 120.

The VCD 120 may include a command processing system 306. The command processing system 306 can include computer instructions to process voice commands received from the voice input receiver 304. In addition, a voice command identifying system 310 is provided. The voice command identifying system 310 can include computer instructions to identify voice commands received at the voice input receiver 304.

The VCD software including voice command recognition processing may be provided locally to the VCD 120 or computing device or may be provided as a remote service over a network, for example as a cloud-based service. The voice command identifying system 310 may be provided as a downloadable update at the VCD software or may be provided as an individual add-on remote service over a network, for example as a cloud-based service.

The voice command identifying system 310 may include a voice input component 323 for receiving a voice input and a direction determining component 322 for determining a direction the voice input is being received from in relation to the position of the VCD 120. The voice input component 323 may receive inputs from the voice input receiver 304 (e.g., which can include indicated directions) and from the command processing system 306 (including voice inputs filtered from non-voice inputs).

The voice command identifying system 310 may include a blocked direction component 311 for learning blocked directions for a given location of the VCD 120 and storing blocked directions in a data store 330.

The voice command identifying system 310 may include a blocked direction lookup component 312 for determining if a new voice input is being received from a stored blocked direction relative to the VCD 120 and a voice input ignoring component 313 for ignoring the received voice input if it is from a blocked direction unless the received voice input is in a recognized command voice as determined by a stored voice component 314. The stored voice component 314 may compare a voice input to stored voice biometrics of registered or recognized command voices to determine if the voice input is in a recognized command voice.

The blocked direction component 311 may carry out analysis and learning from stored data points of received commands and received background noise and may include a command threshold component 315 for blocking a direction when a threshold number of invalid or non-identified commands are received from that direction. The blocked direction component 311 may include a user override component 316 for receiving user instruction to disregard the voice input and add the direction of the voice input to the blocked directions. The blocked direction component 311 may include a background noise component 317 for learning a direction of background noises and blocking background noise from the direction.

In addition to or as an alternative to the blocked direction component 311, the voice command identifying system 310 may include a blocked direction configuration component 324 for user configuration of blocked directions at the VCD 120 for a given location.

The voice command identifying system 310 may include an unblocking component 318 for receiving user instruction that a voice input is valid and removing a direction of voice inputs from the blocked directions.

The voice command identifying system 310 may include a recording component 319 for recording received voice inputs as stored data points with a timestamp and received direction at a data store 330 for analysis to learn blocked directions. A clean up component 320 may carry out a background clean-up of the recorded received voice inputs in the data store 330.

The voice command identifying system 310 may include a new location component 321 for determining that a VCD 120 has a new location, resetting blocked directions, and learning blocked directions for the new location.

Figure 4:
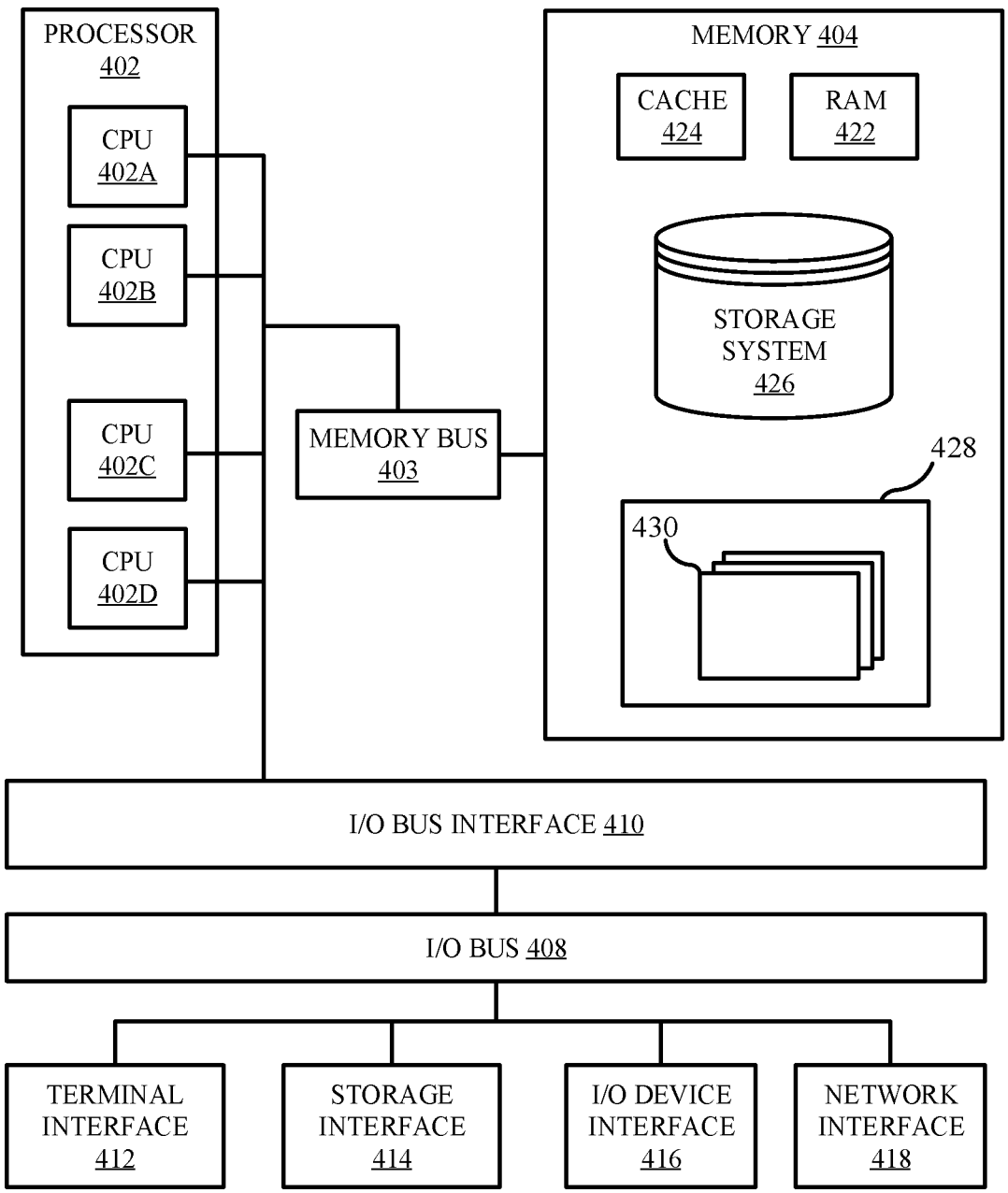
FIG. 4 is a high-level block diagram illustrating an example computer system that can be used in implementing one or more of the methods, tools, and modules, and any related functions, described herein, in accordance with embodiments of the present disclosure.

Referring now to FIG. 4, shown is a high-level block diagram of an example computer system 401 (e.g., VCD 120 of FIGS. 1 and 3) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

In some embodiments, the program modules 430 of the computer system 401 include a voice command filtering module. The voice command filtering module can be configured to determine one or more directions of background noise for a location of a voice command device. Further, the voice command filtering module can be configured to store, in response to determining the one or more directions of background noise, the one or more directions of background noise as one or more blocked directions. The voice command filtering module can be configured to receive a voice input at the voice command device at the location, and determine a direction the voice input is received from. The voice command filtering module can further be configured to compare the direction the voice input is received from to the one or more block directions, and ignore, in response to the direction the voice input is being received from corresponding to a direction of the one or more blocked directions, the received voice input unless the voice input is in a recognized voice.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
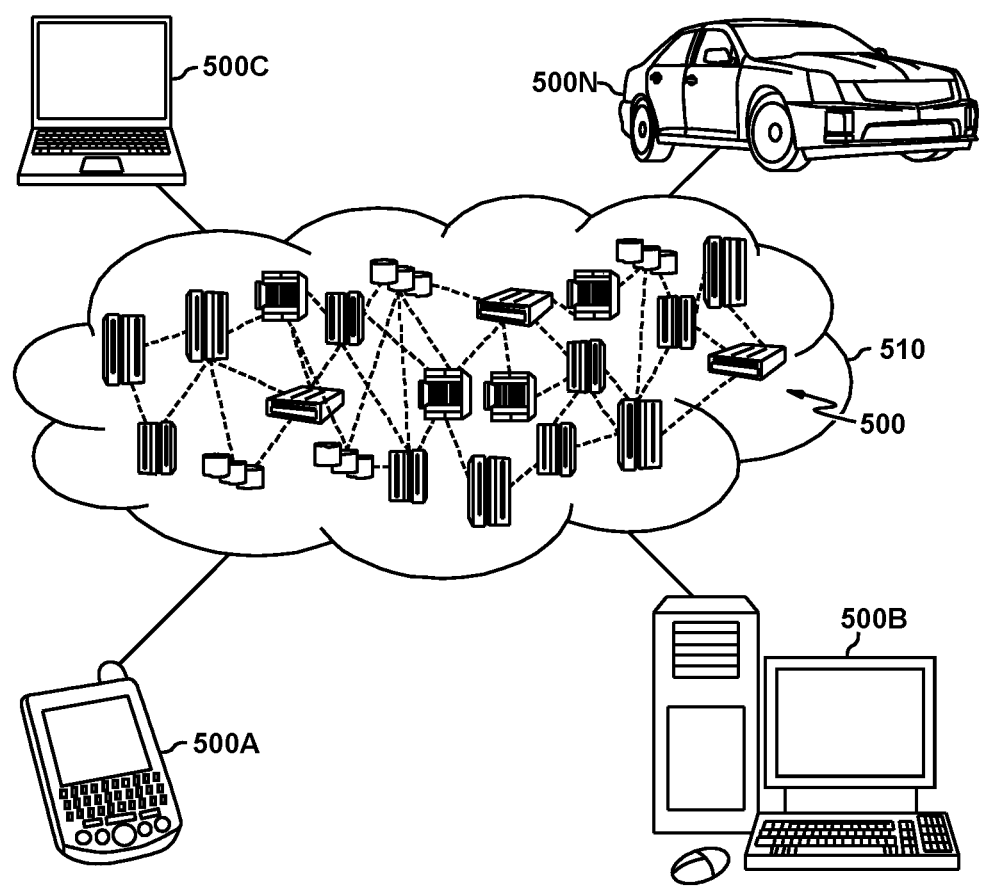
FIG. 5 is a diagram illustrating a cloud computing environment, in accordance with embodiments of the present disclosure.

Referring now to FIG. 5, illustrative cloud computing environment 510 is depicted. As shown, cloud computing environment 510 includes one or more cloud computing nodes 500 with which local computing devices used by cloud consumers, such as, for example, personal digital assistant (PDA) or cellular telephone 500A, desktop computer 500B (e.g., VCD 120) laptop computer 500C (e.g., VCD 120), and/or automobile computer system 500N can communicate. Nodes 500 can communicate with one another. They can be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
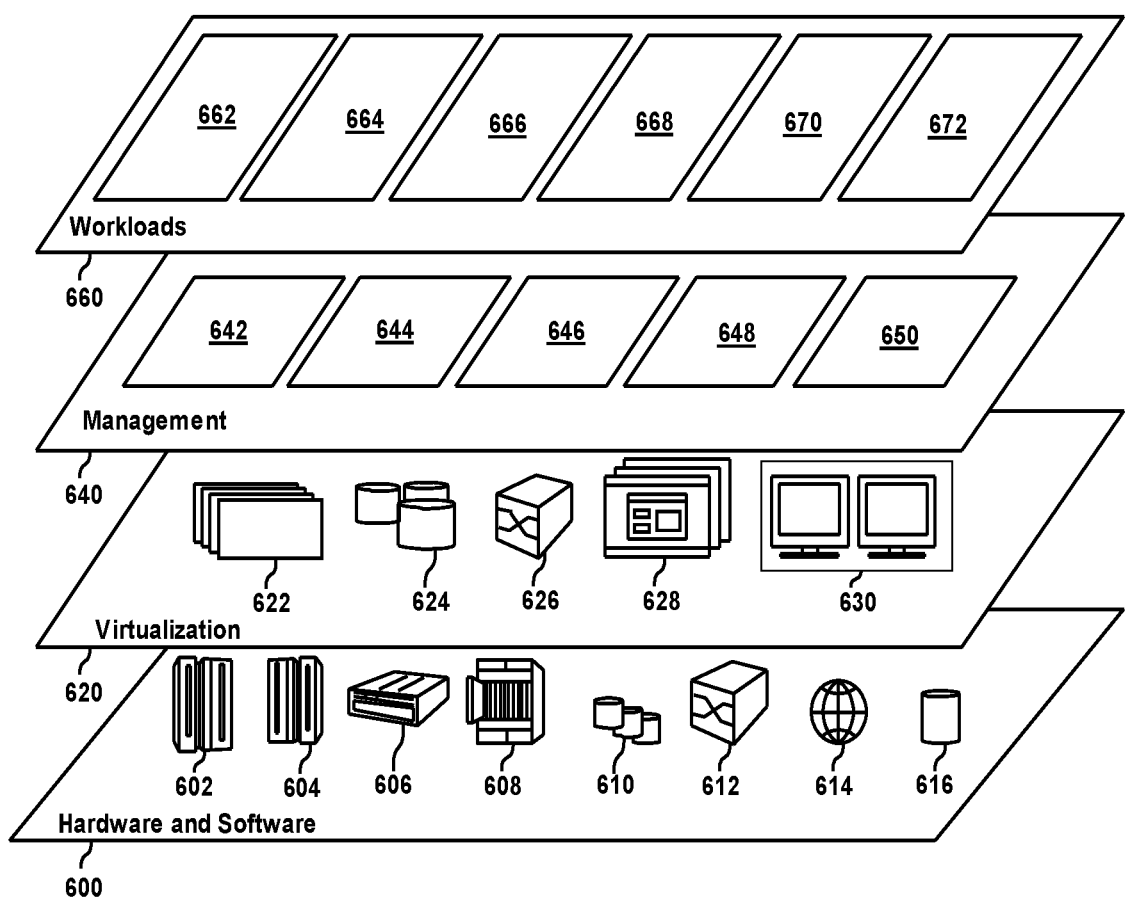
FIG. 6 is a block diagram illustrating abstraction model layers, in accordance with embodiments of the present disclosure.

Referring now to FIG. 6, a set of functional abstraction layers provided by cloud computing environment 510 (FIG. 5) is shown. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities can be provided: virtual servers 622; virtual storage 624; virtual networks 626, including virtual private networks; virtual applications and operating systems 628; and virtual clients 630.

In one example, management layer 640 can provide the functions described below. Resource provisioning 642 provides dynamic procurement of computing resources and other resources that are utilized to perform tasks within the cloud computing environment. For example, resource provisioning 642 can allocate additional computing resources to devices which are indicated to have high activity. Metering and Pricing 644 provide cost tracking as resources are utilized within the cloud computing environment, and billing or invoicing for consumption of these resources. In one example, these resources can include application software licenses. In some embodiments, Metering and Pricing 644 indicates the number of allotted licenses to machines in the system. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment can be utilized. Examples of workloads and functions which can be provided from this layer include: mapping and navigation 662; software development and lifecycle management 664; virtual classroom education delivery 666; data analytics processing 668; transaction processing 670; and identifying an identifiable media 672.

As discussed in more detail herein, it is contemplated that some or all of the operations of some of the embodiments of methods described herein may be performed in alternative orders or may not be performed at all, insofar as they are consistent herein; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for identifying voice commands, comprising:
    determining one or more directions of background noise for a location of a voice command device;
    storing, in response to determining the one or more directions of background noise, the one or more directions of background noise as one or more blocked directions;
    receiving a voice input at the voice command device at the location;
    determining a direction from which the voice input is received;
    comparing the direction from which the voice input is received to the one or more blocked directions; and
    ignoring, in response to the direction from which the voice input received corresponding to a direction of the one or more blocked directions, the received voice input unless the received voice input is in a recognized voice;
    receiving a plurality of voice inputs from a second direction, wherein each of the plurality of voice inputs are received at a distinct time;
    comparing the plurality of received voice inputs to stored command data;
    determining whether each of the plurality of received voice inputs corresponds to the stored command data;
    determining a number of voice inputs that do not correspond to the stored command data;
    comparing the number of voice inputs that do not correspond to the stored command data to a non-command voice input threshold;
    storing, in response to the number of voice inputs that do not correspond to the stored command data exceeding the non-command voice input threshold, the second direction with the one or more blocked directions.

2. The method of claim 1, wherein the received voice input is compared to stored voice biometrics of recognized voices to determine if the voice input is in the recognized voice.

3. The method of claim 1, wherein at least one of the one or more blocked directions are specified by a user.

4. The method of claim 1, wherein when the voice input is in the recognized voice, the method further comprises:
   comparing the received voice input to stored command data; and
   executing, in response to the received voice input corresponding to stored command data, a command of the voice input included in the stored command data.

5. The method of claim 1, further comprising:
   receiving, for an ignored voice input associated with a blocked direction, a user indication that the ignored voice input is valid; and
   removing the blocked direction from the one or more stored blocked directions.

6. The method of claim 1, further comprising:
   storing a timestamp and corresponding direction with each received voice input.

7. The method of claim 1, wherein blocked directions are determined by a range of angles of incidence of sound at the voice command device.

8. A system for identifying voice commands, comprising:
   at least one processor;
   at least one memory component;
   a blocked direction component for determining one or more directions of background noise for a location of a voice command device and storing one or more blocked directions in a data store;
   a voice input receiver for receiving voice inputs at the voice command device at the location and a direction determining component for determining a direction from which each voice input is received;
   a blocked direction lookup component for determining whether each voice input is being received from a stored blocked direction relative to the voice command device for the location; and
   a voice input ignoring component for ignoring a voice input of the voice inputs if it is received from a blocked direction unless the voice input is in a recognized voice as determined by a stored voice component, wherein the blocked direction component is configured to attempt to identify a stored command for each received voice input and, when a given voice input of the received voice inputs is not identified as the stored command, store a direction of the given voice input with the blocked directions, wherein the blocked direction component includes a threshold component for determining if a threshold number of non-command voice inputs are received before storing the direction of the given voice input with the blocked directions.

9. The system of claim 8, wherein the stored voice component compares the voice input to stored recognized voices to determine if the voice input is in the recognized voice.

10. The system of claim 8, wherein the blocked direction component includes a user override component for receiving user instruction to disregard the given voice input and add the direction of the given voice input to the blocked directions.

11. The system of claim 8 including an unblocking component configured to receive user instruction that the given voice input is valid and remove the direction of the given voice input from the one or more blocked directions.

12. The system of claim 8, further comprising:
   a recording component for recording received voice inputs as stored data points with a timestamp and a corresponding direction.

13. The system of claim 8, wherein the blocked direction component includes two or more speakers and is configured to determine the one or more directions of the background noise at the location by using time difference of arrival between the two or more speakers.

14. The system of claim 8, including a new location component for:
   determining that the voice command device has a new location; and
   removing the one or more blocked directions from storage.

15. A computer program product for identifying voice commands, the computer program product comprising a computer readable storage medium having program instructions embodied therewith, the program instructions executable by a processor to cause the processor to perform a method comprising:
   determining one or more directions of background noise for a location of a voice command device;
   storing, in response to determining the one or more directions of background noise, the one or more directions of background noise as one or more blocked directions, wherein at least one blocked direction of the one or more blocked directions is determined based on a threshold number of non-command voice inputs being received from the at least one blocked direction;
   receiving a voice input at the voice command device at the location;
   determining a direction from which the voice input is received;
   comparing the direction from which the voice input is received to the one or more blocked directions;
   ignoring, in response to the direction the voice input is being received from corresponding to a direction of the one or more blocked directions, the received voice input unless the received voice input is in a recognized voice;
   receiving a second voice input at the voice command device at the location;
   determining a second direction from which the second voice input is received;
   comparing the second voice input to a stored command data;
   storing, in response to determining that the second voice input does not match the stored command data, the second direction as a blocked direction;
   receiving a third voice input at the voice command device at the location;
   determining a third direction from which the third voice input is received;
   comparing the third voice input to the stored command data;
   determining that the third voice input corresponds to the stored command data;
   receiving an indication by a user to ignore the third voice input; and
   storing the third direction as a blocked direction,
   wherein the one or more directions of background noise, the direction of the voice input, the second direction of the second voice input, and the third direction of the third voice input are determined based on time difference of arrival (TDOA) using two or more microphones included in the voice command device.

\* \* \* \* \*